Fig. 1.
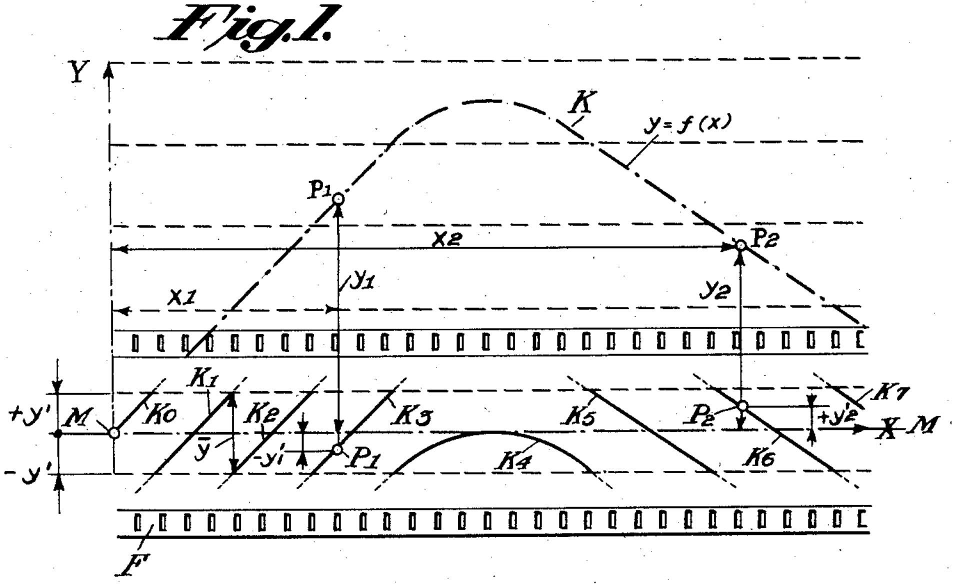
Fig. 3. Fig. 2.
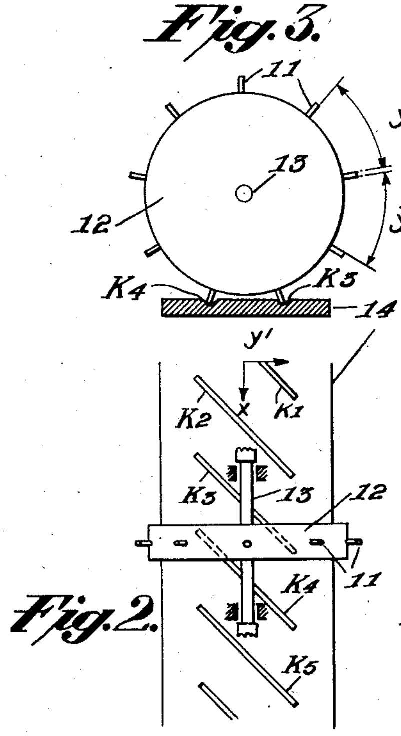
Fig. 9.
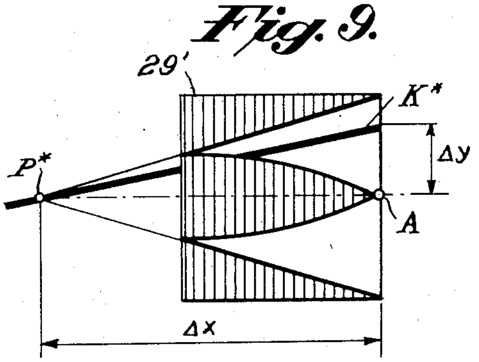
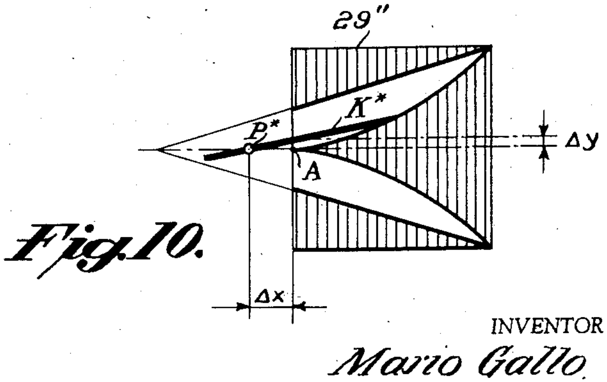
INVENTOR
Mario Gallo
BY Stone, Boyden & Mack.
ATTORNEYS INVENTOR
Mario Gallo.
BY Stone, Boyden & Mack.
ATTORNEYS INVENTOR
Mario Gallo.
BY Stone, Boyden & Mack.
ATTORNEYS INVENTOR
Mario Gallo BY Stone, Boyden & Mack
ATTORNEYS INVENTOR
Mario Gallo
BY Stone, Boyden & Mack
ATTORNEYS INVENTOR
Mario Gallo.
BY Stone, Boyden & Mack
ATTORNEYS INVENTOR
Mario Gallo.
BY Stone, Boyden & Mack.
ATTORNEYS 2,883,557

FUNCTION GENERATING APPARATUS

Mario Gallo, Zurich, Switzerland, assignor to Contraves A.G., Zurich, Switzerland, a corporation of Switzerland Application July 1, 1954, Serial No. 440,773

14 Claims. (Cl. 250—219)

This invention relates to a function generating apparatus, and more particularly, to an apparatus for generating an output quantity having a predetermined functional relationship to a variable input quantity.

An example of a function generator of the class to which the apparatus of the present invention belongs is a cam and follower, the cam having a surface configuration corresponding with a predetermined function, and the cam being moved in accordance with a variable input quantity. In the cam and follower type of function generator, the follower is moved to change its position in accordance with the predetermined functional relationship between the input and output quantities. The variable input quantity is represented by movement of the cam, and the variable output quantity is represented by the position of the follower. The configuration of the surface of the cam, in a cam-and-follower function generator, represents a predetermined function and the cam is a function storage device. Other types of function generators may have electric function storage devices, such as a computer resistance, a computer capacitor, or a computer inductance.

The aforementioned types of function generators may be used in automatic controllers or analog computers.

The apparatus of the present invention improves considerably the accuracy of reproduction of a stored function, even at high working speeds. Moreover, this invention improves the ease of change to other functions.

The present invention uses as a function storage device a movable recording strip or chart having a function recorded thereon in polydromic representation. A function $y=f(x)$ is recorded on the chart with the abscissa axis of the representation parallel to the sides of chart and to the direction of movement thereof.

The apparatus of the present invention further includes a scanning device with respect to which the recording chart is moved. The scanning device scans the ordinate values of the curve segments of the polydromic representation, and comprises a rotatable curve follower or scanner, and means for generating an error voltage proportional in magnitude and sign to the error between the angular position of the curve follower and the angular position directed by the polydromic representation. The generated error voltage is supplied through appropriate means to correct the angular position of the curve follower.

Though not necessary, it is preferable that the segments of the curve of the polydromic representation on the chart be optically different from the surrounding area of the chart, so that the scanning device can employ as its error voltage generator a differential photocell system to which an image of the polydromic representation is conveyed by an objective lens system. In such case, the curve follower or scanner may include a rotatable optical director which influences the path of light between the curve segments and the objective. When the optical director is in the position directed by the recorded function, the image of the curve segment beneath the director is directed to the center of the photocell system and no error voltage is generated. However, when the director is not in the proper angular position, the image of the curve segment directing that position is not at the center of the photocell system, and an error voltage is generated thereby, which is proportional in amplitude and phase to the amount and direction of the angular error. The error voltage is used to change the angular position of the director to reduce this error.

The apparatus of the present invention will now be more fully described in conjunction with the accompanying drawings, which illustrate preferred embodiments of the invention.

In the drawings:

Fig. 1 is a plan view of a preferred form of function storage device, having a function recorded thereon in polyhydromic representation;

Fig. 2 is a plan view of a completely mechanical function generator constructed in accordance with the present invention;

Fig. 3 is an elevational view, partly in section, of the apparatus of Fig. 2;

Figs. 9 and 10 are plan views of modifications of the image screen diaphragm of Fig. 7;

Figures 4, 5:
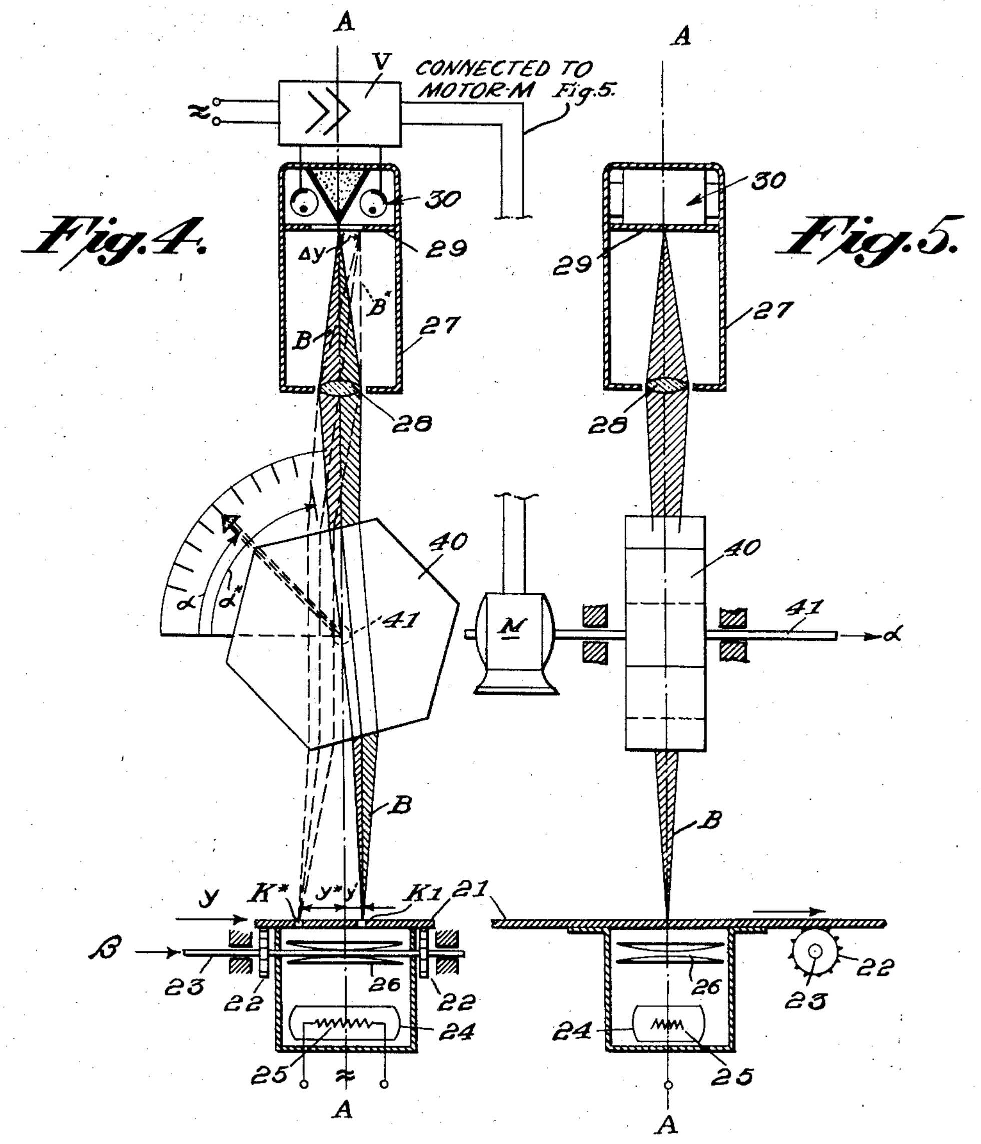
Fig. 4 is a sectional view taken along line A—A of Fig. 5, and showing a preferred form of function generator, using an optical relationship between the elements of the apparatus.
Fig. 5 is a sectional view, taken along line A—A of Fig. 4.

Referring first to Fig. 1, the film F is a function storage device, having slots or perforations preferably evenly spaced along both its outer sides. The perforations may perform a double function, being cooperable with film transport wheels to move the film along its length, and constituting measurement indications for determining the extent of that movement.

The function stored on the film consists of a series of curve segments $K_0$, $K_1$ . . . $K_7$, forming a polydromic representation of a curve K which represents the function. The curve K is shown in broken line to indicate the correspondence between it and the polydromic curve segments.

The longitudinal center line M—M of the film forms the abscissa axis $x$ of the curve segments, which are recorded as a function $y=f(x)$. The ordinate values $y'$ of the points on the curve are measured in the Y direction, naturally perpendicular to the X axis.

It will be understood that the polydromic representation here employed permits the representation of a function on a relatively narrow recording chart, even though a large scale is chosen for the ordinate quantity. Such a representation is often used for recording measured values which are variable with respect to time.

In the illustrated polydromic representation, the curve segments $K_1$–$K_7$ convey the same information about the variation of the ordinate values $y$, as a function of the abscissa value $x$, as does the function curve K. The curve segments $K_1$–$K_7$ lie in a recording band of width $\bar{y}$, symmetrically arranged with respect to the abscissa axis X. The curve segments are extended beyond both edges of the band, as indicated by dotted lines in Fig. 1, for reasons discussed hereinafter.

To determine an ordinate value $y$ corresponding to a particular abscissa value $x$, in such a polydromic representation, the product $n\bar{y}$ is added to the measured ordinate value $y'$ between the X axis and the point on the curve segment corresponding to the particular value of $x$. $\bar{y}$ is the width of the recording band, which has a constant known value, and is also the jump distance between adjacent curve segments. $n$ is a whole integer obtained by counting the number of jumps between the origin ($x=0$, $y=0$) of the function and the particular value of $x$, with jumps in the region of positive slope of the curve counted positive and jumps in the region of negative slope counted negative. Also, the ordinate value of the curve segment corresponding to the particular $x$ value is counted positive or negative, depending on whether the curve segment is above or below the X axis at that point.

As an illustration, the ordinate of the point $P_1$, having abscissa $x_1$, $y_1=3\bar{y}-y_1'$, and the ordinate of the point $P_2$, having abscissa $x_2$, $y_2=2\bar{y}+y_2'$.

Since the distance $\bar{y}$ is a constant and is known, $n$ is readily determined, and the abscissa can be determined accurately, for instance by counting the number of perforations between the origin and the selected abscissa, only the value of $y'$ is susceptible to error. One of the purposes of this invention is to reduce the error in $y'$ to a negligible value. It should be noted here that the abscissa value will not be in substantial error, even with changes in humidity or temperature, because of the use of perforations in the film strip for measurement of abscissa values.

The present invention uses a tape-type function storage carrier, on which a predetermined function $y=f(x)$ is recorded in polydromic representation, as an element of a function generator which produces an output quantity having a predetermined functional relationship with a variable input quantity. The means for shifting the position of the carrier may be controlled in accordance with the input quantity, and the device for scanning the ordinate values of the function on the carrier may be positioned in accordance with that function, either to produce the output quantity directly, or to control another suitable device to produce the output quantity.

As seen in Figs. 2 and 3, the invention includes a function carrier in the form of a film 14 having a polydromic representation of the function recorded thereon. This function generator is completely mechanical in operation and includes a wheel scanning device 12 having a plurality of feeler rods 11 arranged at regular intervals $\bar{y}$ (see Fig. 1 for $\bar{y}$) along its periphery. The wheel is rotatable by a shaft 13 positioned parallel to the $x$-axis of the function storage carrier tape 14. Appropriate means, not shown, may be provided to move the film 14, parallel to its longitudinally-extending sides, in accordance with a variable input quantity.

A function $y=f(x)$ is recorded on the film 14 in polydromic curve segments $K_1, \ldots K_5$, etc. The polydromic curve segments are engraved on the tape in the form of grooves, and the width in the $y$-direction of the segments corresponds to the distance $\bar{y}$ between feeler rods 11. As a result, one feeler rod can slide along a curve segment $K_3$ and an adjacent feeler rod follow an adjacent segment $K_4$.

With the apparatus of Figs. 2 and 3, it will be obvious that the angular position of shaft 13, at a displacement of the function carrier tape 14 in its $x$-direction determined by the input quantity, will depend on the function $y=f(x)$ recorded on the carrier tape. The angular position of the shaft 13 then represents an output quantity having the predetermined relationship to the input quantity (tape position) determined by $y=f(x)$.

While the apparatus of Figs. 2 and 3 will operate in accordance with the invention to produce reasonably accurate results, it has been found preferable to use an optical method of controlling the position of the scanning device. The apparatus of Figs. 4 and 5 is constructed in accordance with this preferred operation.

In Figs. 4 and 5, a blackened film strip 21 having appropriate edge perforations, is used as the function storage carrier. A function $y=f(x)$ is recorded on the film strip as light-transmitting curve segments, arranged in polydromic representation, as above explained. The film moving or transporting apparatus may include a pair of toothed wheels 22 mounted on an input shaft 23 and arranged to engage the edge perforations of the film strip. The shaft may be rotated in any desired manner and by appropriate mechanism (not shown) in accordance with the input quantity. The rotational position $\beta$ of the shaft 23 representing the input quantity is changed into abscissa movement of the film strip 21.

A reference axis A—A, fixed and perpendicular to the plane of the film strip, intersects the film strip on its center axis. The position of the film with respect to this axis A—A determines the instantaneously observed abscissa value $x$ of the recorded function, and the ordinate value of the corresponding curve point, measured in the $y$ direction of the film strip, determines the desired instantaneous quantity $y'$.

An illuminating device including a lamp 24, having a light emitting surface 25, is arranged below the film with its optical axis coinciding with axis A—A. An optical condenser 26 focuses the light from surface 25 on the film strip in such manner that each light-transmitting curve section represents an evenly illuminated area, when seen from above.

A preferably cylindrical tube 27 is supported above the film strip by appropriate means (not shown) in such manner that its axis coincides with axis A—A. In the tube, an objective lens system 28 focuses light transmitted through the film strip 21 on an image screen diaphragm 29. As will be discussed in conjunction with Figs. 7 and 8, the image screen diaphragm transmits a portion of the light focused on it to a differential photocell arrangement 30. It need only be stated at this point that the objective reproduces in the plane of the image screen diaphragm a sharp representation of the portion of the film strip 21 near the optical axis A—A.

A regular polygon prism 40 of $2n$ sides, where $n$ is a whole integer, is mounted between the objective 28 and the film strip 21 to control the passage of light therebetween. The polygon prism here shown as a hexagon, though it need not be, is carried by a shaft 41, which extends parallel to the abscissa axis of the stored function representation, and is rotatable to change the angular position of the prism with respect to the film strip. Each two diametrically opposite surfaces of the glass prism act as plane parallel glass in the path of the light rays to produce parallel displacement thereof, which displacements have magnitudes determined by the angle between the perpendicular to the glass surface and the direction of light rays.

As an illustration of the action of the prism, the solid cone of light rays B departs from point $K_1$ (shown on the film strip 21 as part of a curve segment) and passes through the prism to the objective 28. The objective focuses the cone B in the plane of the image screen diaphragm. As shown in Fig. 4, the prism 40 has an angular position with respect to the horizontal, such that curve point $K_1$, which has a displacement $y'$ in the ordinate direction from axis A—A, is reproduced in diaphragm 29 on the axis A—A. As will be clear from later descriptions, this is the condition for proper position of the prism 40.

In contrast, a cone of light rays B*, shown in dashed lines, and emanating from a point K*, having an ordinate displacement $y^*$ from the optical axis, is reproduced in the plane of the diaphragm at a distance $\Delta y$ from the optical axis, for the same angular position $\alpha$ of the prism.

The differential photocell arrangement 30 supplies its output to the input of a voltage amplifier V, which in turn is connected to a servo motor M. The servo motor controls the position of the shaft 41 of the prism in accordance with the voltage received from the amplifier V. The action of this electrical error-correction system will be discussed more fully hereinafter in conjunction with Fig. 6. At this point it is sufficient to state that the amplifier V generates a torque voltage for the motor M in accordance with the detection furnished by the differential photocell arrangement 30, and that the sign and magnitude of this voltage depends on the direction and magnitude of the displacement $\Delta y$ of a selected curve point image (for instance B*) in the plane of the image screen diaphragm, from the optical axis A—A. In response to this voltage, the motor M automatically turns the prism 40 in such direction as to reduce the displacement $\Delta y$. If a curve point such as $K_1$, has such an ordinate position $y'$ and the prism 40 has such a position that the displacement $\Delta y$ is zero, the servo motor receives no torque voltage and the motor does not rotate the shaft 41. If, however, a curve point, such as K*, has such an ordinate position $y^*$ and the prism has such a position $\alpha$ that the displacement $\Delta y$ between the image of the curve point and the optical axis is other than zero, the motor will receive a torque voltage which will cause movement of the prism to a position to annul that voltage and return the image to the optical axis. Such a position may be represented by $\alpha^*$, for curve point K*.

For every possible value of ordinate deviation $y'$ of the curve points of the stored curve there is a final position of the prism 40 which will focus that curve point on the optical center of the image screen diaphragm. If the film strip is displaced in the $x$ or abscissa direction by movement of shaft 23, the prism will follow automatically the change of ordinate value $y'$ of the curve segment scanned, assuming rotational values $\alpha$ dependent upon the function recorded.

When a continuously increasing or decreasing function $y=f(x)$ increases or decreases to an ordinate value such that the representation on the function carrier goes outside the width of the recording strip $\bar{y}$, and an adjacent curve segment enters the recording strip (for example, the region of maximum value of segment $K_0$ and minimum value of segment $K_1$ of Fig. 1), the ray path of the segment shifts from one pair of glass planes to another pair of adjacent planes on the prism. This shift always occurs when an edge between the two plane pairs moves through the optical axis A—A. The details of the shift will be explained hereinafter. At any rate, it is obvious that, with a continuously increasing or decreasing function $y=f(x)$, the prism will turn continuously in the same direction, and that it will change its direction of rotation with a change in direction of the slope of the function, that is, in a region of maximum or minimum of the function $y=f(x)$.

First, let us assume that the film strip moves only with a very slow speed. In this quasi-static mode of operation, the displacement $\Delta y$ of the curve point images on the image screen diaphragm from the optical center A—A attains a negligibly small value, since the optical-electrical system can readily correct the rotational position $\alpha$ of the prism 40 to reduce the error $\Delta y$ toward zero, even though the voltages corresponding to values of $\Delta y$ are very small. Under this condition, the rotational position $\alpha$ of the prism shaft 41 constitutes an output quantity which varies in predetermined relationship with the input quantity, or angular position $\beta$ of the input shaft 23. However, the relation $\alpha=f(\beta)$ is not identical with the function $y=f(x)$ recorded on the film strip, even in this condition, because the relationship between the ordinate values $y'$ of the curve points and the corresponding angles of rotation of the prism is not linear. This non-linearity can be taken into account when the function is recorded on the film strip by correcting the $y'$ values such that a predetermined relation $\alpha=f(\beta)$ between the rotational values $\alpha$ and $\beta$ results.

Figures 17, 18:
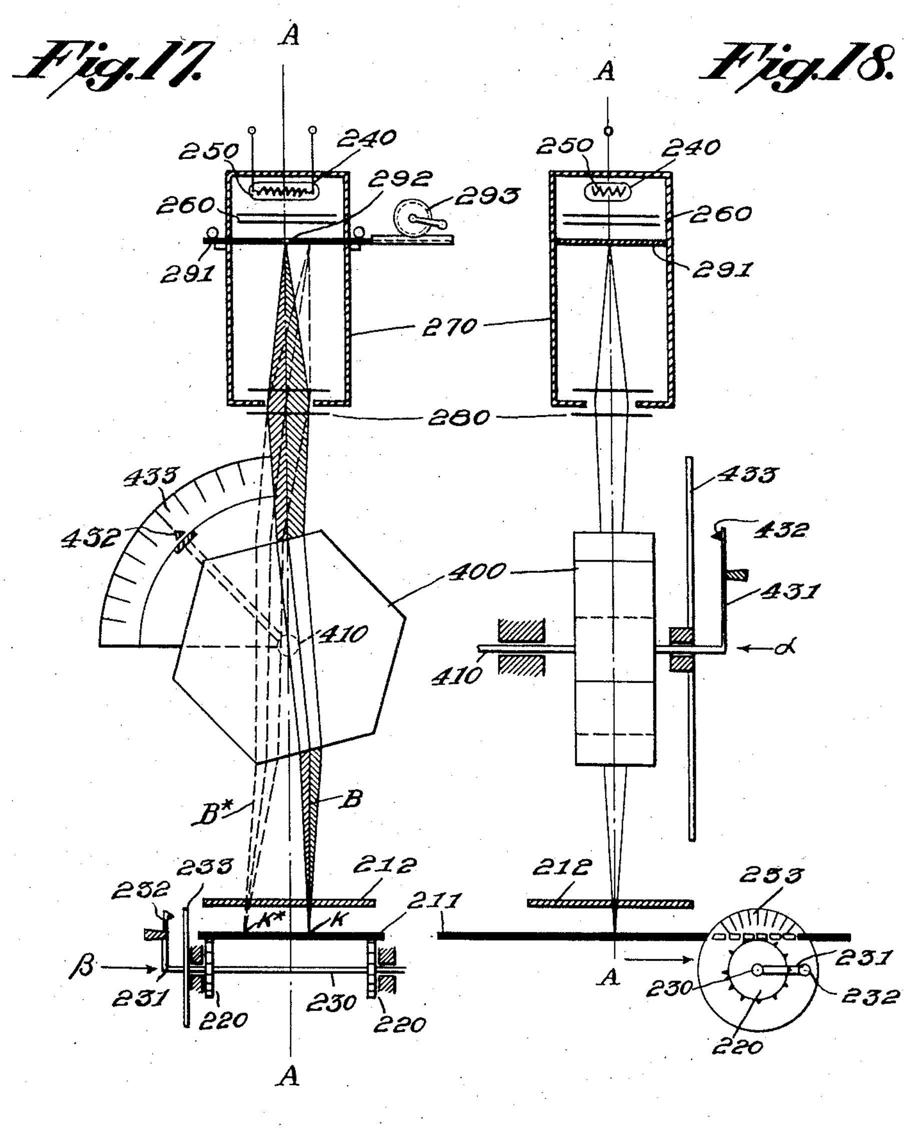
Fig. 17 is a sectional view, taken along line A—A of Fig. 18, showing a preferred type of apparatus for recording a function on a film; and, Fig. 18 is a sectional view, taken along line A—A of Fig. 17.

Departing for the moment from a description of a function generator for reproducing a desired function, we will describe an apparatus for recording such a function on a film strip. Figs. 17 and 18 show such an apparatus, which is optically inversely identical with the apparatus of Figs. 4 and 5. Accordingly, corresponding parts have been given the same numerals, with an added digit 0.

In Figs. 17 and 18, the film moving apparatus includes an input shaft 230 carrying a pair of toothed film transport wheels 220, arranged to cooperate with the perforations in the film strip 211. A crank 231 is also mounted on the input shaft and may be positioned by any suitable mechanism (not shown) in any suitable manner. The position of the shaft and crank are indicated by a pointer 232, cooperating with a dial 233. This arrangement permits the shaft 230 to be turned in small steps, as desired. The rotatable shaft 410 of the prism 400 also carries a crank 431 and a pointer 432, so that prism 400 can arbitrarily be adjusted to any rotational value $\alpha$ which can be read on dial 433.

In the tube 270, the objective lens system 280 and the pinhole diaphragm 291 are mounted, the latter replacing the image screen diaphragm 29. The pinhole 292 of the pinhole diaphragm 291 is located normally on the optical axis A—A, but it can be displaced in the Y-direction with respect to that axis, by means of a cog gear 293.

The pinhole 292 is illuminated from above with light transmitted from a bulb 240, having an illuminating area 250, through an optical condenser 260. The apparatus operates to expose the unexposed film strip 211 point-by-point in such fashion that, after its development, a polydromically represented function $y=f(x)$ will appear as a number of light-transmitting curve segments on a black background. A slit diaphragm 212 has its slit extending parallel to the Y-direction and intersecting the optical axis A—A. The diaphragm may be provided with means to open its slit momentarily when, for the instantaneous input angle $\beta$ of the input shaft 230, the prism has been adjusted so that its shaft has an angular position $\alpha$ determined by the desired function $\alpha=f(\beta)$. In the alternative, means may be provided to control energization of the bulb 240 in such manner that it will produce a momentary emission when the prism has attained the proper angular position. In such case, the slit of the diaphragm may be kept open at all times. Means for performing these last functions are not shown in the drawings because they may be of any appropriate type and do not form a specific part of this invention.

Since the light beam follows an identical course in both directions of propagation, the non-linearity in the function $\alpha=f(y')$, noted above, may be corrected by recording the curve by apparatus of the type shown in Figs. 17 and 18, and reproducing it by the optically-identical apparatus of Figs. 4 and 5.

Figure 6:
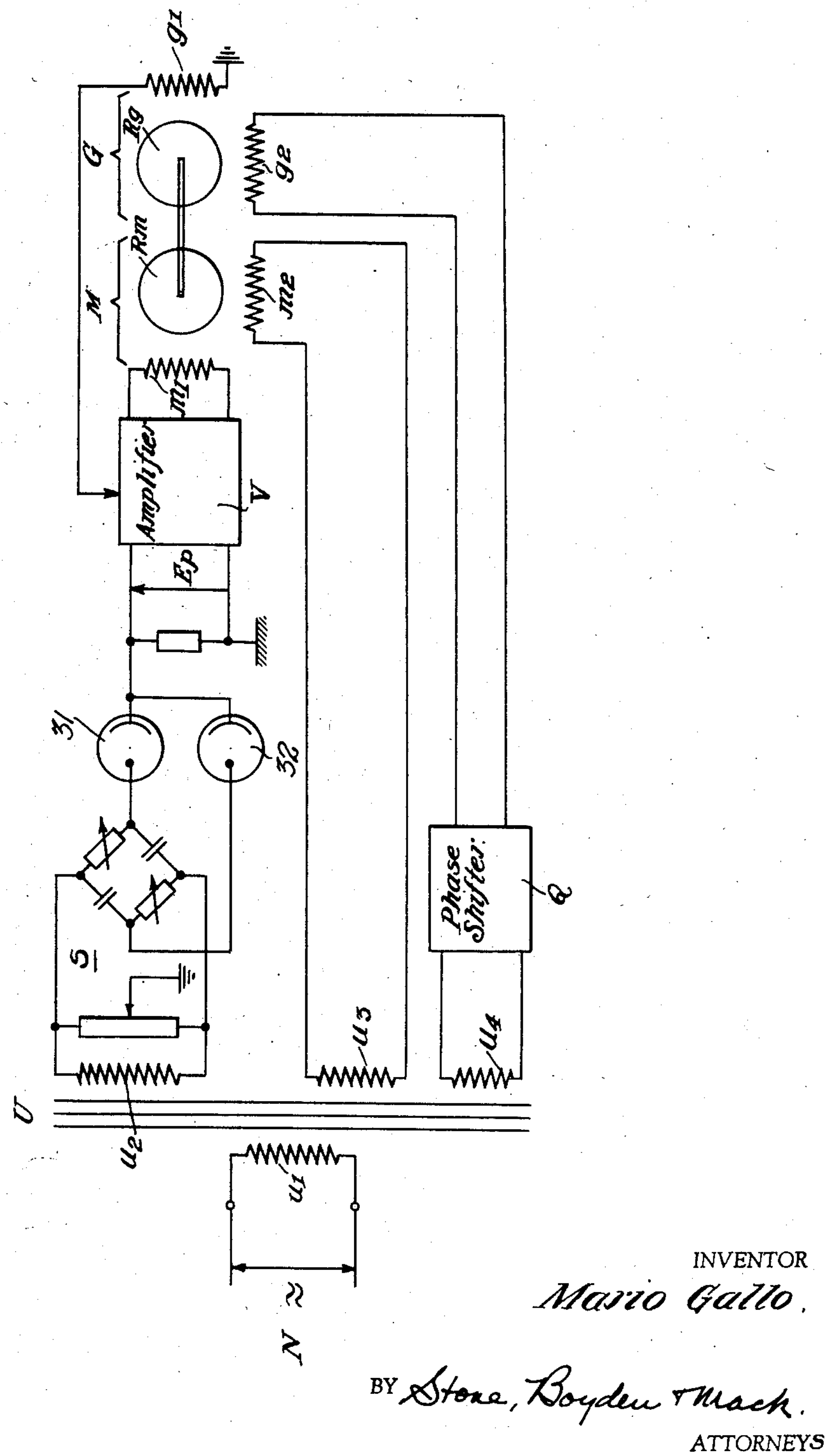
Fig. 6 is a schematic diagram of the electrical apparatus of the function generator shown in Figs. 4 and 5.

Referring now to Fig. 6, the electrical circuits of the function generator of Figs. 4 and 5 include a transformer U supplied with an A.-C. voltage from a source N, through a primary winding $u_1$. The A.-C. voltage induced in the secondary winding $u_2$ is transmitted with opposite polarity to the two photocell systems 31 and 32 through an appropriate device S for shifting the phase of the voltage and insuring the symmetry thereof. The output voltage of the photocell systems is supplied to the input of an amplifier V as an error voltage $E_p$. The voltage $E_p$ will have opposite phases or signs, depending on whether the photocell system 31 and 32 receives the larger amount of light. The voltage $E_p$, after amplification by the amplifier V, is suplied as a torque voltage to the servo motor M.

The armature of motor M is identified by $Rm$, the field winding by $m_2$ and the excitation winding by $m_1$. The field and excitation windings are positioned at right angles to each other, so that the direction of rotation of the motor depends on the sign of the amplified voltage $Ep$, and the speed of rotation increases continuously with increasing $Ep$. The field winding $m_2$ is supplied with voltage through winding $u_3$ of transformer U.

An appropriate and well-known apparatus to improve the response of the servo motor includes a generator G, having its armature $R_g$ coupled with armature $R_m$ of the motor. The generator G may have its winding $g_2$ connected through an appropriate phase shifting device Q to winding $u_4$ of the transformer. Winding $g_1$ of the generator, positioned at right angles to winding $g_2$, may be connected to feed back voltage to the amplifier V.

As indicated above, the servo system is designed in such fashion that the speed of rotation of the motor, and hence of the prism, increases continuously with the magnitude of the displacement $\Delta y$ of the curve point focused on the image screen diaphragm from the optical center of the diaphragm, and in such fashion that the direction of rotation of the motor and prism is determined by the direction of the displacement from the optical center.

Since we now have a servo system with a speed-dependent opposing coupling which produces a rotational speed of the output shaft closely proportional to the magnitude of the input voltage ($E_p$), and since the output voltage of the photocell system is closely proportional to the amount of light impinging on it, it only remains to insure that the amount of light effective to control the photocell system increases in close proportion to the displacement error $\Delta y$. If this last step is performed, the position of the prism shaft will be in close conformity with the predetermined relationship between the output quantity and the input quantity.

Figure 8:
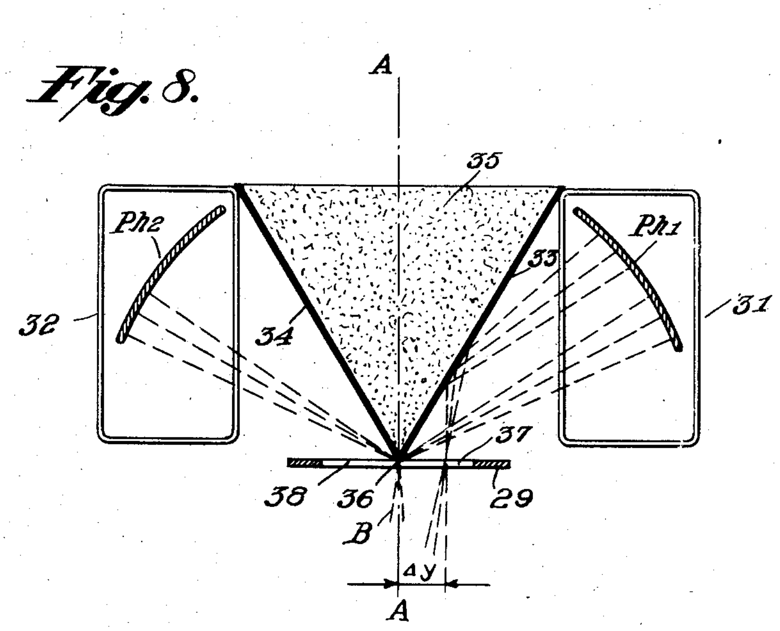
Fig. 8 is an enlarged scale view of a portion of the apparatus of Fig. 4.
Figure 7:
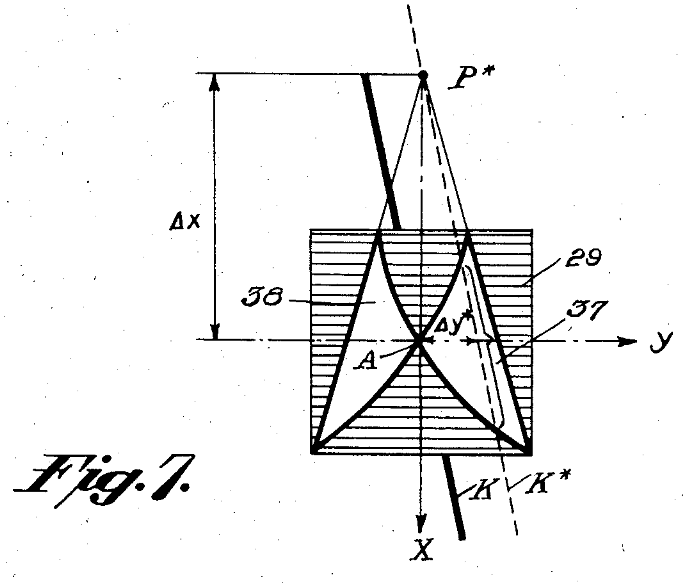
Fig. 7 is a plan view of the image screen diaphragm of Figs. 4, 5 and 8.

This last necessary step is performed by the photocell arrangement 30 and the image screen diaphragm 29 shown in Figs. 4 and 5, and, more particularly, in Figs. 7 and 8. The differential photocell arrangement 30 includes two similar photocells 31 and 32 having light sensitive surfaces $Ph_1$ and $Ph_2$, respectively. The latter are positioned symmetrically with respect to the plane defined by the X-axis and the optical axis A—A. The mirror surfaces 33 and 34 of a prism 35 are inclined symmetrically with respect to this plane. The edge of intersection 36 of these two mirror surfaces lies in the plane of the image screen diaphragm 29 and extends in the X-direction. The image screen diaphragm has two image openings 37 and 38 positioned symmetrically with respect to the X axis and designed to pass light through them onto the mirror surfaces. The image openings are triangular in shape and have a common corner coinciding with the intersection of the optical axis A—A with the image screen diaphragm.

In operation, an image of the area surrounding the optical axis of the film strip 21 appears in the plane of the image screen diaphragm, so that portions of the curve segments adjacent the optical axis appear in this plane. With reference to the coordinatae system X—Y of the film strip, the optical center of the image screen diaphragm has the abscissa $x_a$ and the ordinate $y_a$. The abscissa value $x_a$ changes with film motion and the ordinate value $y_a$ changes with motion of the diverting prism 40. In the quasi-static or slow moving type of operation, the image of a curve segment K always passes through the optical center of the image screen diaphragm 29, because in this case, the diverting prism is always able to assume a rotational position corresponding to that which causes the curve point to be reproduced in the optical center A. The path of light beam B is illustrative of this condition.

Examining light beam B, equal amounts of light are seen to be incident on the two photocell surfaces $Ph_1$ and $Ph_2$, that is, the light cone B is split into two equal light cones along the edge of intersection 36 of the mirror surfaces 33 and 34. If the width of the curve segments were infinitesimally small, no light at all would pass into the photocells, since the X-dimension of the image openings 37 and 38 at the optical center has the value zero. However, this is not the case, because of finite width of the curve segments, but the amount of light on both photocells is equal and no error or torque voltage results.

The relation $$\frac{dy}{dt}=\frac{dx}{dt}\cdot\frac{dy}{dx}$$

exists between the velocity of change $$v_y=\frac{dy}{dt}$$

and the velocity of the film motion $$v_x=\frac{dx}{dt}$$

The factor $$\frac{dy}{dx}$$

represents the slope $a_x$ of the curve segment K in the region $X=x_a$. The necessary speed of rotation of the diverting prism 40 to maintain the proper position of the prism $$\frac{d\alpha}{dt}$$

increases, therefore, with the product $$a_x\cdot\frac{dx}{dt}$$

and this presupposes a correspondingly increasing displacement $\Delta y$ of the image of the curve segment K* from the optical center. Now, at high speed of film motion and with curve slopes that are not negligibly small, the diverting prism can follow the changes in ordinate value only if the displacement $\Delta y$ of the curve image from the optical center A of the image screen diaphragm is not negligibly small. Consequently, under such conditions, what we might term the dynamic mode of operation, a dynamic error $\Delta y$ must exist in the relative positions of the image curve K* and the optical center A of the image screen diaphragm, in order for the position of the shaft of the diverting prism to correspond to the position of the input shaft in accordance with the predetermined relationship $\alpha=f(\beta)$.

With a predetermined performance of the photoelectric servo system and the slope of curve segments K′ limited to a maximum value $$\frac{dy}{dx}(m)=a(m)$$

for a predetermined maximum speed of the servo motor, that is, for a corresponding maximum displacement $\Delta y$ max, a certain maximum speed of film motion is given by the following equation:

$$V_{xm}\frac{\frac{dy}{dt}(m)}{\frac{dy}{dx}(m)}=\frac{c.\Delta Y_m}{a(m)}$$

where $c$ is a constant.

When the speed of film motion is kept constant at this value, all curve segments K* reproduced in the plane of the image screen diaphragm 29 originate in a point P* which lies in the X-axis of the plane of the image opening.

This point is displaced with reference to the optical center of this plane by the constant known value $\Delta x$, regardless of the amount of slope of the curve in this point P*. The boundary lines of the two image openings 37 and 38 opposite the optical center A are therefore straight lines, as shown in Fig. 7, and point towards this vanishing point P* with a slope $$\frac{dy}{dx}=0.3 \text{ and } -0.3$$

respectively, preferably. The boundary lines of the image openings originating from the optical center A of the image openings are curves formed in such manner that the length K* of the parts of the straight lines originating in this vanishing point P* and appearing in the image openings will increase proportionally to the displacement $\Delta y$ from the optical center A, from the value 0, which occurs at $\Delta y=0$, to a maximum value, which occurs at $\Delta y=y_m$. This is necessary, because, as mentioned above, the amount of light which can be incident on the photocell in question through a window opening should increase proportionally with the displacement $\Delta y$ of the curve image from the optical center A of the image screen diaphragm.

It would be possible to produce the image of the film strip directly on the light sensitive surfaces of a differential photocell arrangement, without the use of the image screen diaphragm as described above, but it would then be necessary to design the photocell surfaces so that their shapes produce the same characteristics. Though this could be done, the special design of the image screen diaphragm described offers considerable advantages over the other manner of accomplishing the same results. For instance, the photocells used with the special diaphragm are of conventional design and can be cheaply and easily replaced.

It would also be possible to replace the image screen diaphragm having the specially designed light openings with a glass plate blackened in the region of the X-axis and less blackened with increasing displacement $\Delta y$. This arrangement is also less economical than the one shown in the drawings.

However, image screen diaphragms of the types shown in Figs. 9 and 10 could be substituted for that shown in Fig. 7. The two modifications of these later figures are identified by numerals 29' and 29'', respectively, and differ from diaphragm 29 only in the fact that the optical center A of these modified diaphragms is at the edge thereof, so that either the portion of the curve which is ahead of the optical center (in the direction of film strip movement) in the $x$-direction, or the portion of the curve which is behind the optical center, is effective. Fig. 10 shows how a part of the curve K* appears in the image opening when the speed of movement of the film strip, $V_x$, is less than the maximum speed $V_{x(m)}$ for which the diaphragm 29'' was designed. In this case, the point of origin P* of the curve image K* lies between the vanishing point of the straight line sides of the image openings and the optical center A. Consequently, a reduced abscissa lag $\Delta x$, from that for which the diaphragm was designed, results. The displacement $\Delta y$ of the curve image K* from the optical center is therefore less than the displacement for which the diaphragm was designed, and the resulting rotational speed of the diverting prism will also be less, proportionately.

Figures 11, 12:
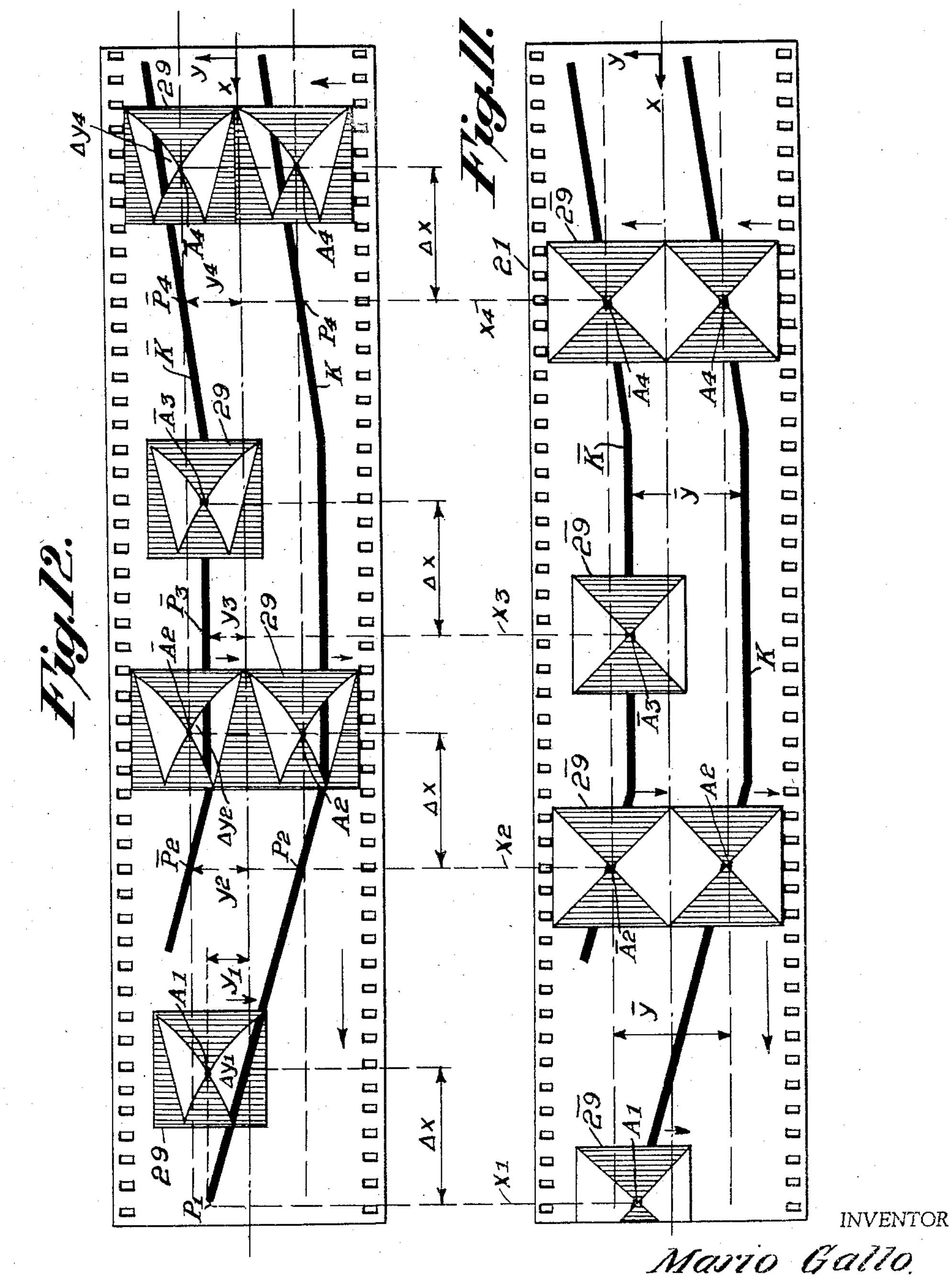
Fig. 11 is a diagrammatic view of a function storage film and an image screen diaphragm, showing the interaction of these elements in a quasi-stationary or slow-moving condition.
Fig. 12 is a view corresponding to Fig. 11, showing the interaction in a dynamic or fast-moving condition.

Fig. 11 shows the relationship between the film plane and the diaphragm for the quasi-static or slow-moving type of operation, in several different positions. In that figure, the plane of the drawing coincides with the plane of the film strip 21 and the image screen diaphragm $\overline{\mathbf{29}}$ is shown projected on the same plane. The film strip has the coordinate axes X and Y. The width of the film strip $\bar{y}$ is shown by dashed lines, symmetrical with respect to the X-axis. Since the quasi-static mode of operation is illustrated in Fig. 11, the triangular image openings of diaphragm 29 are symmetrical with respect to the Y-axis and their bounding edges are straight lines.

Two curve segments K and $\overline{K}$, displaced from each other, in the ordinate direction by recording band width $\bar{y}$, are shown in Fig. 11. Actually, of course, the film strip is moved in the X-direction with respect to the image screen diaphragm, but for clarity of viewing, the strip is shown as stationary and the image screen diaphragm is shown at several positions on the film for different abscissa values $x_1$, $x_2$, $x_3$ and $x_4$. Since the relative movement between the film strip and the diaphragm is very slow, the diverting prism can readily follow the positions directed by the curve segments, that is, the $y$-values of the curve segments K and $\overline{K}$, respectively, so that the curve segments pass through the optical center $A_1$, $A_2$, $\overline{A}_3$ and $A_4$ of the diaphragm, in all positions. Consequently, no lag error $\Delta y$ occurs.

As shown in Fig. 11, the projection of the diaphragm moves from the position $A_1$, along the portion of the curve K of this region, to the position $A_2$, where the diaphragm projection effectively moves (actually, by movement of the diverting prism) to the upper position $\overline{A}_2$ directed by curve segment $\overline{K}$. This is because the curve segment K leaves the recording band at this point, and the curve segment $\overline{K}$ enters the recording band. The projection of the diaphragm next moves from position $\overline{A}_2$ to position $\overline{A}_3$. In the region of the latter position, the diaphragm projection makes no movement in the $y$-direction, since the $y'$ values of the curve segment $\overline{K}$ are constant in this region. In the region of abscissa value $x_4$, the function curve $y=f(x)$ rises with positive slope and passes through the boundary of the recording band. Consequently, the diaphragm projection moves to the other segment K, which is entering the recording band at this point.

In contrast to the quasi-static mode of operation shown in Fig. 11 is the dynamic mode of operation illustrated in Fig. 12. The representation of this figure corresponds with Fig. 11, except that the image screen diaphragm 29 is designed for dynamic operation with the two sides which intersect at the optical axis being curvilinear, and the speed of film strip motion is relatively high. The speed of film strip motion is adjusted to a constant value $$\frac{c\Delta y}{0.3}$$

as directed by the above equation, so that the abscissa values $x_1$, $x_2$, $x_3$ and $x_4$, respectively, whose ordinate values are equal to the ordinate values $y_1$, $y_2$, $y_3$ and $y_4$ of the points $A_1$, $A_2$, $A_3$ and $A_4$, respectively (that is, the centers of the diaphragm projections) are ahead of the abscissa values of these center points by the constant quantity $\Delta x$.

In the region of position $A_1$, of the diaphragm projection 29, the curve K decreases with the maximum slope for which the system was designed, so that the deviation error $\Delta y$ necessary to operate the system has its maximum positive value, and the proper speed of displacement in the direction of the negative Y-axis is achieved. When the center $A_2$ of the diaphragm projection passes through the boundary line of the recording band, that is, at ordinate values $\pm y'=\pm ym=\pm\bar{y}/2$, transfer to the adjacent curve segment $\overline{K}$ takes place. Between the abscissae $x_2$ and $x_3$ the curve segments show sudden changes to the horizontal direction, so that small deviation errors $\Delta y_2$ result and cause the rotational speed of the prism to be adjusted automatically in accordance with these errors. By the time the diaphragm projection has reached position $\overline{A}_3$ corresponding to abscissa $x_3$, the rotational speed of the prism is zero.

In the region of abscissa $x_4$, the curve segment $\overline{K}$ rises with positive slope. The diaphragm image effectively follows the rise until the recording band boundary is passed, and then changes to a position to scan curve segment K. The displacement values $y_1$, $y_2$, $y_4$ therefore correspond in magnitude and sign with the slope in the regions of the curve segments scanned, at least when the curve segments are linear.

An examination of Fig. 12 shows why the curve segments K and $\bar{K}$ must project outside of the recording band of the film strip. Referring to positions $A_2$, $\bar{A}_2$, the regions of the curve segments below the lower boundary line influence the photocell arrangement when the function $y=f(x)$ is decreasing, and referring to positions $A_4$, $\bar{A}_4$, the regions of the curve segments above the upper boundary line influence the photocell arrangement when the function is increasing.

Referring now to Figs. 13–16, Fig. 13 shows the apparatus of Figs. 17 and 18 used to record a curve point on a film strip. The pinhole diaphragm 291 is adjusted so that the pinhole 292 is on the optical axis A—A, hence the displacement $\Delta y=0$.

The rotational angle to which the prism 400 is adjusted is such that $\alpha(x)=30°$, so that two surface edges of the prism intersect at the optical axis. Consequently, the beam of light B originating at the illuminated pinhole 292 divides at the upper prism edge into two beams $B_1$ and $B_2$. These beams form the image points K and $\bar{K}$, respectively, having the ordinate value $-ym$ and $+ym$, and are separated by the value $\bar{y}$.

Figures 13, 14, 15, 16:
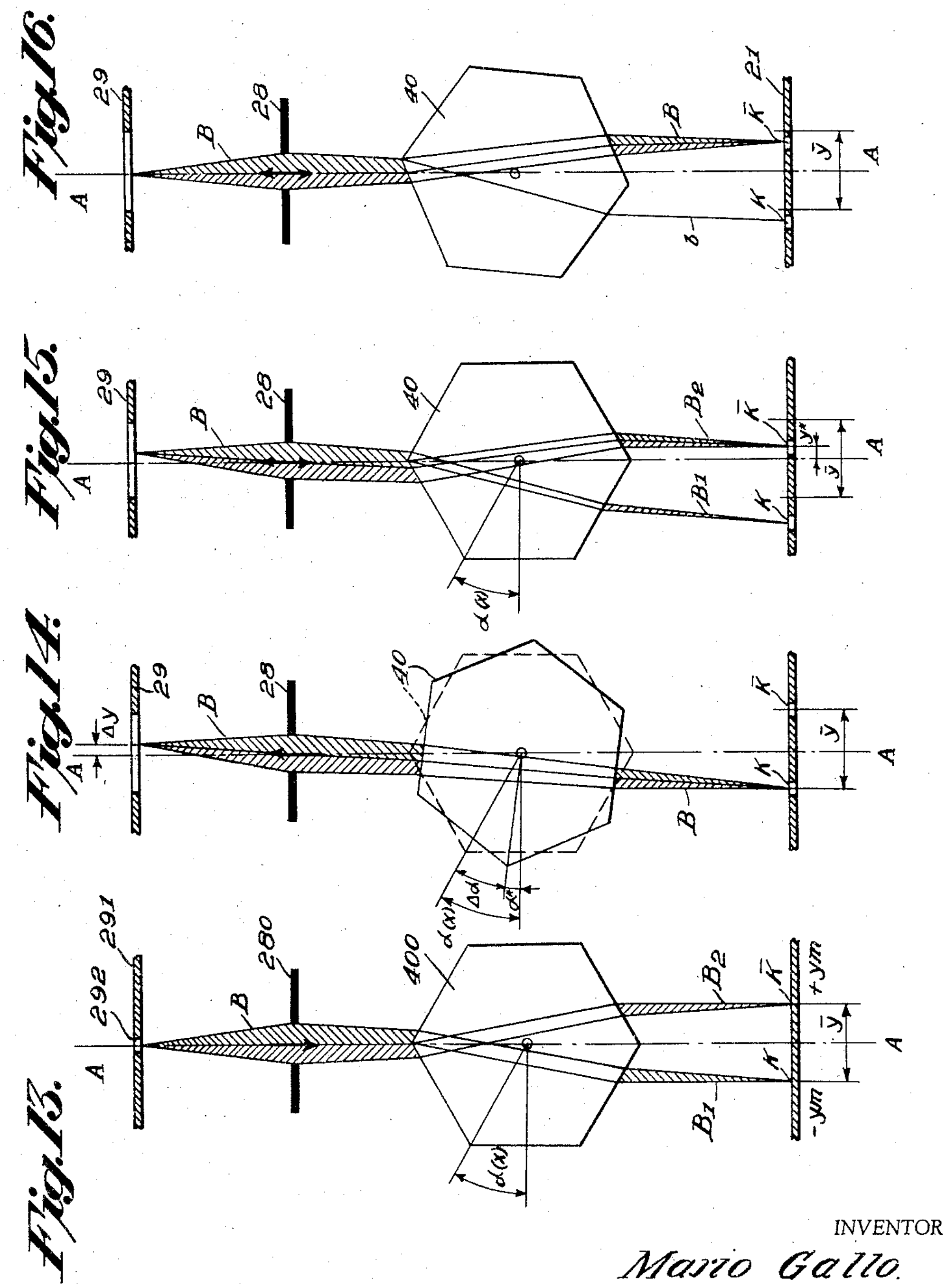
Figs. 13–16 show different light paths through a diverging prism from a film to a diaphragm, depending on the position of the curve segment being scanned.

During reproduction of the image points recorded as in Fig. 13 in the quasi-static mode of operation, at the same $x$ adjustment of the film and the same rotational adjustment $\alpha(x)$ of the diverting prism as in Figs. 13, the two beams $B_1$ and $B_2$ would be united by means of the objective. In the dynamic mode of operation, however, as shown in Fig. 14, a rotational speed $d\alpha/dt$ of the diverting prism is necessary, under the assumption that a certain slope of the curves in the region X exists. This speed occurs only at a certain displacement $\Delta y$. In the rotational position $\alpha^*$ of the prism 40, shown in solid lines, a beam of light B from the curve point K (which corresponds in ordinate value $-y_m$ with the point K of Fig. 13) is reproduced on a point of the image screen diaphragm having a displacement $\Delta y$ from the optical axis. As a result of this displacement, a certain rate of change $$\frac{d\alpha}{dt}$$

of the prism angle, in the direction of the proper angle $\alpha(x)$, indicated by dashed lines in the figure, results. However, at the instant shown in Fig. 14, the prism has not yet responded to this change, and a lag error $$\Delta\alpha=\alpha(x)-\alpha^*$$

results, between the proper angle $\alpha(x)=30°$ for which the prism was adjusted during recording, and the angle actually shown.

Referring now to Fig. 15, the slope of the function $y=f(x)$ for all abscissa values of the function can be computed. It is then possible to compute in advance the necessary displacement error $\Delta y$ for a predetermined constant speed of film motion. Using these computed errors, it is possible to displace the pinhole 292 of the recording device to produce the $y$-values of the curve points on the film strip, so that the function $y=f(x)$ will be reproduced from the film strip without any lag error.

Fig. 15 shows this manner of compensation. In the figure, the prism 40 is in position $\alpha(x)$ corresponding to that of Fig. 13. During recording of the curve segment, a dynamic error $\Delta y$ has been put into the system, in accordance with the computed value. Consequently, the ordinate value $y^*$ of the recorded curve point $\bar{K}$ is different from the ordinate value $+y_m$ of the corresponding curve point $\bar{K}$ in Fig. 13. The ordinate value of point K is also different from the corresponding curve point of Fig. 13, and the beams of light from the two curve points combine at the image screen diaphragm to produce the proper error voltage for the servo system. It will be seen, therefore, that the dynamic error of the system has been compensated for by an intentional error made in recording the curve function, because the prism (whose position represents the output) has the same position as the prism of the recorder in Fig. 13.

In Figs. 14 through 16 is shown the transfer of the light rays of the recorded curve segments from one pair of prism surfaces to the adjacent pair. While, as in Fig. 13, a beam of light from the illuminated pinhole diaphragm 291 of the recorder is split into two equal beams $B_1$ and $B_2$ at the edge of the prism, the two beams of Fig. 15 are not equally strong, and, in Fig. 16, one part of the beam has been reduced to an intensity such that it is represented by the single boundary ray $b$. During reproduction, the beam parts join after passage through the prism to form the effective total beam B.

As indicated above, if the rate of change of the input quantity $\beta$ at reproduction is known in advance, the dynamic displacement error $\Delta y$ which is necessary for error-free reproduction at these speeds, can be taken into account by correcting the individual $y$-values of the curve $y=f(x)$. Consequently, during reproduction, the desired functional relationships $\alpha=f(\beta)$ between the angle of rotation $\alpha$ of the output shaft 41 and the angle of rotation $\beta$ of the input shaft 23, can be produced. However, when the speed of motion of the film strip is not known in advance (for instance, because the input shaft 23 is rotated in dependence upon an unpredictably-varying measurement quantity), advance compensation of the lag error is not possible. In this case, the construction of the image screen diaphragm shown at $\overline{29}$ of Fig. 11 is most advantageous, since the function generator will work as well for reverse as for forward movement of the film, with this construction. This form of image screen diaphragm will produce satisfactory results even for displacement errors $\Delta y$ which are not negligibly small.

During the course of the above description the openings in the image screen diaphragm have been described as triangular. The use of this term in the claims will be understood to cover openings having at least one curved side and also openings having only straight sides.

Since different configurations of image openings of the image screen diaphragm are desirable for different conditions, the function generator is preferably equipped with interchangeable image screen diaphragms having image openings of different forms.

It would be possible to replace the polygon diverting prism of the function generator with a polygon mirror, with corresponding changes in the arrangements of parts.

It is also possible to draw the function $y=f(x)$ on a transparent strip with india ink and to photograph the strip on a film.

With suitably designed differential photocell arrangements, it is also possible to reproduce a stored function in which the curve segments constitute boundary lines between black and transparent parts of the film.

It would also be possible to differentiate the curve segments on the function storage device electrically or magnetically, rather than optically. If such were done, the differential photocell arrangement would be replaced with a detector suitable for the manner of storage of the function.

The function generator of Figs. 4 and 5 can be supplemented for certain applications with a device for converting a different input quantity into a variable rotational position of the input shaft 23, and with a device for conversion of the variable output quantity into another physical quantity. The function generator can also be used as an analog computer in a control mechanism, or as an element in a computing machine. The ease of adaptation of the function generator, and the possibility of attaining almost unlimited exactitude of results, even at high speeds of translation of the function storage device, open up a wide field of application for the function generator described herein.

It will be appreciated that only preferred embodiments of the present invention have been specifically described herein and that many changes could be made, besides the modifications described above, without departure from the scope of the invention. Accordingly, the invention is not limited by the description but only by the appended claims.

I claim:

1. Apparatus for generating an output quantity having a predetermined functional dependence upon a variable input quantity, comprising a recording strip having a function $y=f(x)$ recorded thereon in polydromic representation and having the abscissa axis of said representation parallel to a side of said strip, means for displacing said strip in the direction of said one side thereof in predetermined functional dependence upon said variable input quantity, means for scanning the ordinate values of the polydromic representation on said strip, said scanning means including a movable curve scanner the position of which is susceptible to error, and said scanning means further including means for generating a signal having a magnitude and sign dependent upon the magnitude and sign of the position error of the curve scanner and means connected to said curve scanner controlled by said signal to move the curve scanner to reduce its error in position.

2. Apparatus as defined in claim 1 in which said recording strip has equally-spaced perforations extending along said one side thereof, and said means for displacing the strip comprises a rotatable shaft, and toothed wheels mounted on said shaft for rotation therewith engaging said perforations.

3. Apparatus as defined in claim 1 in which said curve scanner is rotatable, said generating means produces an electric voltage, and said means connected to the curve scanner is an electric motor whose direction of movement is controlled by the sign of said voltage.

4. Apparatus for generating an output quantity having a predetermined functional dependence upon a variable input quantity, comprising a recording strip having a function $y=f(x)$ recorded thereon in polydromic representation and having the abscissa axis of said representation parallel to a side of said strip, the curve segments of said polydromic representation differing optically from the surrounding area of the strip, means for displacing said strip in the direction of said one side thereof in predetermined functional dependence upon said variable input quantity, means for scanning the ordinate values of the polydromic curve segments on the strip; said scanning means including an objective, a rotatable optical diverter positioned between the objective and said recording strip, the angular position of the optical diverter representing said output quantity, and a differential photocell system positioned to receive light rays from said objective, said optical diverter being constructed and arranged to transmit light rays from curve segments on the recording strip to the objective in such fashion, when the optical diverter is in other than the proper angular position directed by said predetermined functional dependence, that the output of the photocell system is of direction and magnitude corresponding to the direction and magnitude of departure of the diverter from proper angular position; a servo motor connected to drive said optical diverter, and means connecting the output voltage of said differential photocell system to said motor to cause rotation of the motor in a direction and with a speed determined by the output of the photocell system to move the optical diverter toward the proper angular position.

5. Apparatus as defined in claim 4 in which said optical diverter is a regular polygon prism having $2n$ sides, where $n$ is a whole integer, mounted on a shaft extending parallel to the abscissa axis of the polydromic representation.

6. Apparatus as defined in claim 5 in which said polygon prism is a reflecting prism.

7. Apparatus as defined in claim 5 in which said polygon prism is a refracting prism.

8. Apparatus for generating an output quantity having a predetermined functional dependence upon a variable input quantity, comprising a recording strip having a function $y=f(x)$ recorded thereon in polydromic representation and having the abscissa axis of said representation parallel to a side of said strip, the curve segments of said polydromic representation differing optically from the surrounding area of the strip, means for displacing said strip in the direction of said one side thereof in predetermined functional dependence upon said variable input quantity, means for scanning the ordinate values of the polydromic segments on the strip; said scanning means including an objective, a rotatable regular polygon refracting prism of $2n$ sides, where $n$ is a whole integer, positioned between the objective and the recording strip, the angular position of the polygon prism representing the output quantity, a differential photocell system having an optical axis extending parallel to the abscissa axis of the recording strip and so constructed that the output of the photocell system in magnitude and direction is determined by the magnitude and direction of the lack of symmetry of light rays reaching the system, a support for said photocell system, said support and said objective being so fixedly arranged with respect to the polygon prism and the recording strip that the common optical axis of the support and the objective passes through the axis of the polygon prism and intersects the abscissa axis of the recording strip and the optical axis of the photocell system perpendicularly, and illuminating means positioned on the opposite side of the recording strip from the polygon prism and positioned adjacent the extension of said common optical axis, said polygon prism directing light through the objective to the photocell system in such fashion, when the polygon prism is in other than the proper angular position directed by said predetermined functional dependence, that the ouput of the photocell system is of direction and magnitude corresponding to the direction and magnitude of departure of the polygon prism from proper angular position; a servo motor connected to drive said polygon prism, and means connecting the output voltage of said photocell system to said motor to cause rotation of the motor in a direction and with a speed determined by the output of the photocell system to move the polygon prism toward the proper angular position.

9. Apparatus as defined in claim 8 in which the polydromic representation is recorded in a recording band of said recording strip and includes adjacent curve segments entering and leaving the recording band at the same abscissa location, and said polygon prism gathers together beams of light from one segment at one boundary of the recording band and from an adjacent segment at the other boundary of the recording band into a single beam of light to be transmitted to the objective.

10. Apparatus as defined in claim 8 in which said photocell system comprises a pair of photocells arranged symmetrically on opposite sides of the optical axis of the photocell system, a pair of mirror surfaces having edges meeting on the optical axis of the photocell system and extending therealong and being inclined symmetrically away from each other, and an image screen diaphragm positioned between the objective and the optical axis of the photocell system and extending parallel to the recording strip, said objective focusing light from said recording strip in the plane of the image screen diaphragm.

11. Apparatus as defined in claim 10 in which said image screen diaphragm has a pair of triangular-shaped image openings arranged symmetrically with respect to the optical axis of the photocell system, the two image openings having a common corner in the common optical axis of the objective and support.

12. Apparatus for generating an output quantity having a predetermined functional dependence upon a variable input quantity, comprising a recording strip having a function $y=f(x)$ recorded thereon in polydromic representation and having the abscissa axis of said representation parallel to a side of the strip, the curve segments of said polydromic representation differing optically from the surrounding area of the strip, means for displacing and strip in the direction of said one side thereof in predetermined functional dependence upon said variable input quantity, means for scanning the ordinate values of the polydromic segments on the strip; said scanning means including an objective, a rotatable regular polygon refracting prism of $2n$ sides, where $n$ is a whole integer, positioned between the objective and the recording strip, the angular position of the polygon prism representing the output quantity, a differential photocell system having an optical axis extending parallel to the abscissa axis of the recording strip, said photocell system including a pair of photocells arranged symmetrically on opposite sides of said optical axis, a pair of mirror surfaces having edges meeting on the optical axis of the photocell system and extending therealong and being inclined symmetrically away from each other and from the recording strip, an image screen diaphragm positioned between the objective and the optical axis of the photocell system and extending parallel to the recording strip, said diaphragm having a pair of triangular-shaped image openings arranged symmetrically with respect to the optical axis of the photocell system, a support for said photocell system, said support and said objective being so fixedly arranged with respect to the polygon prism and the recording strip that the common optical axis of the support and the objective passes through the axis of the polygon prism and intersects the abscissa axis of the recording strip and the optical axis of the photocell system perpendicularly, and illuminating means positioned on the opposite side of the recording strip from the polygon prism and positioned adjacent the extension of said common optical axis, the image openings of said diaphragm having a common corner in the common optical axis of the objective and support and being each defined by three edges, the edge opposite the common corner of each of the openings extending angularly with respect to the optical axis of the photocell system in such fashion that, if these two opposite edges were extended beyond the boundaries of the image screen diaphragm they would intersect on the optical axis of the photocell system at a point displaced from the optical axis of the diaphragm in the direction of forward movement of the recording strip, the other edges of each of the image openings being curvilinear in such fashion that the maximum extent of any part of a straight line drawn in the plane of the diaphragm from said point of intersection, which passes through said image openings, is approximately equal to the distance between said point of intersection and said common corner, said polygon prism directing light through the objective into the plane of the image openings in such fashion, when the polygon prism is in other than the proper angular position directed by said predetermined functional dependence, that the output of the photocell system is of direction and magnitude corresponding to the direction and magnitude of departure of the polygon prism from proper angular position; a servomotor connected to drive said polygon prism, and means connecting the output voltage of said photocell system to said motor to cause rotation of the motor in a direction and with a speed determined by the output of the photocell system to move the polygon prism toward the proper angular position.

13. Apparatus as defined in claim 12 in which the curve segments on the recording strip have a slope $dy/dx$, and the corresponding slope of the edges of the image openings opposite the common corner thereof is greater than said slope $dy/dx$.

14. Apparatus as defined in claim 12 in which said image openings are symmetrical with respect to the $y$-axis of the image screen diaphragm.

References Cited in the file of this patent

UNITED STATES PATENTS

| | | |
|---|---|---|
| 2,463,534 | Hawkins | Mar. 8, 1949 |
| 2,535,348 | Caan | Dec. 26, 1950 |
| 2,545,331 | Works | Mar. 13, 1951 |
| 2,592,018 | Fairbanks | Apr. 8, 1952 |